United States Patent Office 3,418,836
Patented Dec. 31, 1968

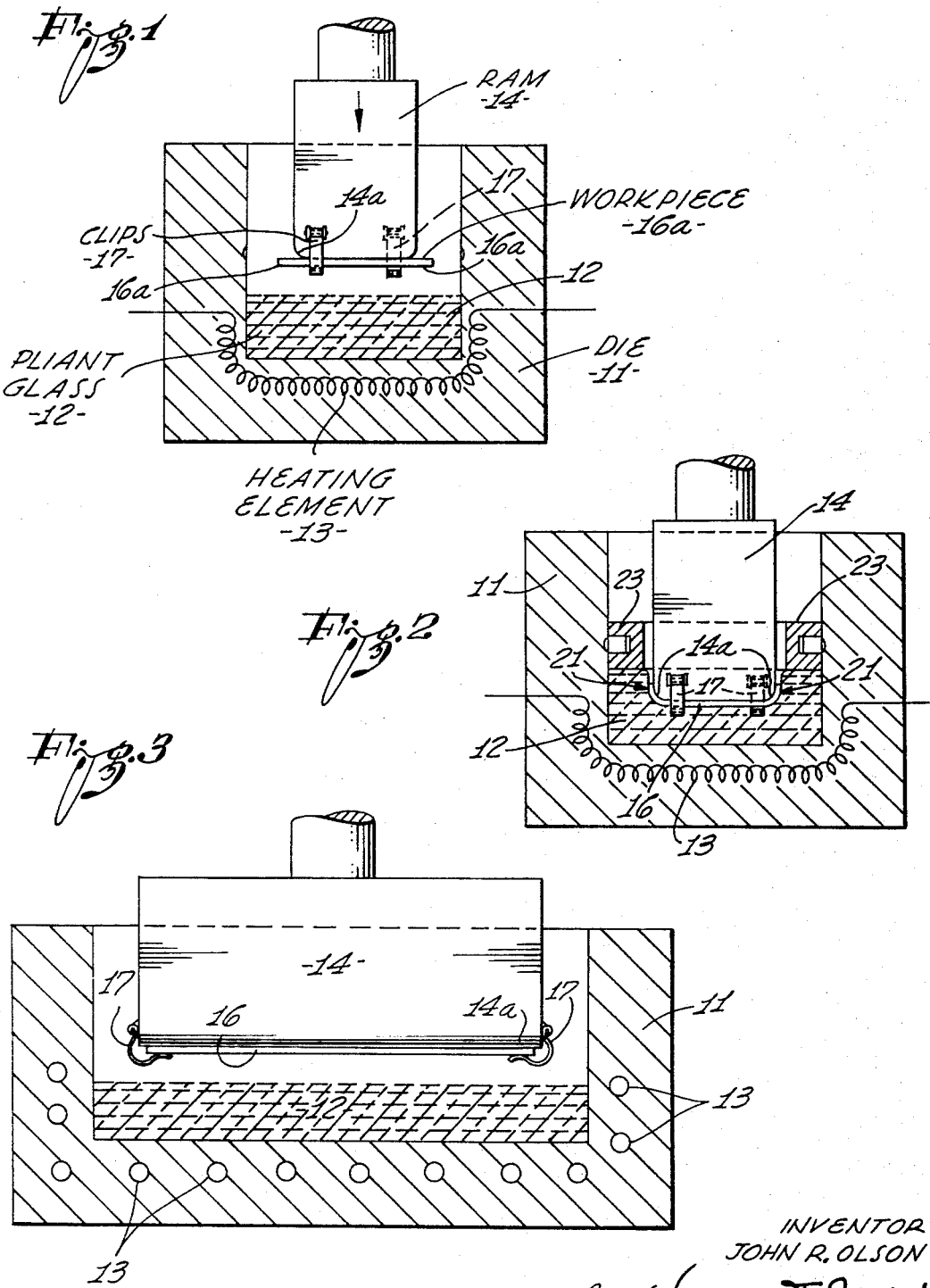

3,418,836
FORMING METALS USING LIQUID DIES
John H. Olson, 4221 Ben Ave.,
Studio City, Calif. 91604
Filed May 5, 1966, Ser. No. 547,961
6 Claims. (Cl. 72—57)

ABSTRACT OF THE DISCLOSURE

An improved process and apparatus is provided for forming metals and which uses liquid dies. The apparatus uses a vitreous material in a female die, the vitreous material being raised to a high temperature at which it becomes pliant. The part to be shaped is attached to a ram, and the ram is moved into the pliant vitreous material in the female die. Appropriate blocks are placed over the pliant vitreous material in the female die, so that the vitreous material may exert a high pressure against the workpiece, as the ram is moved down into the vitreous material.

---

The present invention relates to an improved process and apparatus for forming metals using liquid dies; and it relates more particularly to such an improved process and apparatus which make use of a pliant vitreous material for forming metals at elevated temperatures.

Liquid dies have been used in the past in the forming of metals to desired shapes and configurations. Notably, liquid rubber has been used for this purpose. However, the inability of such liquid dies to operate satisfactorily at high temperatures, and other drawbacks, have limited the use thereof to the forming of a rather limited class of metals.

For example, the forming of titanium has long presented serious problems in the art. This is because such a metal must be heated to an extremely high temperature before it is sufficiently pliable to be formed into desired configurations.

The process of the present invention makes use of vitreous material, such as glass, as a liquid die. The vitreous material is preferably heated to a viscous pliant state, rather than to a fully liquid state, this being achieved at the usual operating temperatures for forming metals, such as titanium.

In the ensuing specification and claims, the term "liquid" will be intended to apply equally to the vitreous material in such a pliant state. The fact that the vitreous material achieves the aforesaid viscous pliant state at the forming temperatures of metals, such as titanium, makes it easier to handle in the equipment, since there is little tendency for the material to "leak" through small apertures in the equipment.

An object of the present invention, therefore, is to provide an improved metal forming process which makes use of glass in a pliant condition as a forming die; and also to provide improved apparatus for carrying out such a process.

Other objects and advantages of the invention will become more apparent from a consideration of the following description, when the description is taken in conjunction with the accompanying drawing, in which:

FIGURE 1 is a schematic representation of apparatus suitable for carrying out the process of the invention; the apparatus including a pressure-operated ram, and the ram being illustrated in FIGURE 1 in its upper position;

FIGURE 2 is a schematic view, like FIGURE 1, and showing the ram in its lower position; and FIGURE 3 is a schematic representation, showing a side view of the apparatus, whereas FIGURES 1 and 2 show end views.

FIGURES 1, 2 and 3 show a press having a female die 11. The female die contains, for example, a vitreous material, such as a selected glass 12. The glass is held at an elevated temperature by means of an electrical, or other heating element 13. The elevated temperature coincides, for example, with the temperature at which the metal to be formed may be worked, and the selected glass is one which exhibits a pliant viscous property at such a temperature.

The die 11 in the illustrated embodiment may be formed, for example, of a suitable material capable of withstanding high temperatures. In the particular embodiment, the die is illustrated as having a rectangular shape. However, it will be appreciated that other shapes and sizes may be used.

A male ram, or plunger, 14 is supported by any appropriate means. The ram is forced down into the female die 11 under high pressure. The ram, for example, may be part of a press, and may be capable of existing forces of, for example, 400–500 tons.

A metal workpiece, constituting the part to be formed, is affixed to the underside or face of the ram 14. The part may be supported on the face of the ram by any appropriate means, such as by clips 17.

The glass 12, as mentioned above, is selected so that when it is raised to a given temperature by the heating element 13, it will become pliant and have the proper viscosity to force the sides of the member 16 around the corners 14a of the ram 14.

As the ram proceeds downwardly the pliant glass exerts still further pressure against the workpiece, and forces it against the face of the ram with high pressure. This action serves to take out wrinkles or other irregularities from the surface of the formed workpiece. The action also serves to force the workpiece into and around any offsets or cavities in the face of the ram, so that it may be formed into any desired irregular shape.

A pair of blocks 23 are supported over the top of the die 11, in close proximity with the side faces of the ram 14. These blocks serve to contain and encapsulate the pliant glass in the die 11. Therefore, as the ram 14 proceeds down into the pliant glass at high pressure, it causes the glass to move against the workpiece and exert an extremely high forming force on the workpiece. The blocks 23 are spaced a predetermined distance above the surface of the glass 12, so that a desired force may be exerted by the glass on the workpiece.

With certain metals, for example, with titanium, it has been found that optimum results are achieved when the process is conducted very slowly, so that the workpiece may be "creep" formed. That is, a definite time factor is injected into the forming process so that the ram 14 is moved very slowly into the pliant glass in the die 11, allowing the workpiece time to respond to the bending pressure on its surface. This takes advantage of better elongation characteristics of the titanium when creep-forming is employed.

It is presently contemplated that the optimum temperature at which this operation will be performed in somewhere around 1200°–1400° F., in the case of titanium. This is because it has been found that titanium may be more readily formed in such a temperature range.

For that particular purpose, therefore, in the forming of titanium, it is desirable to employ a glass 12, which at 1200°–1400° F. has just the right viscosity to achieve the proper forming of the workpiece around the face of the ram 14.

While a particular embodiment of the invention has been shown and described, it is evident that modifications may be made. It is intended in the claims to cover all modifications which come within the scope of the invention.

What is claimed is:

1. A process for forming metal workpieces, and the like, using liquid dies, which comprises:
   placing a vitreous material in a female die;
   heating the vitreous material in the die to an elevated temperature at which the metal workpiece can be worked and at which the vitreous material exhibits a pliant viscous property;
   affixing the working piece to a ram; and
   forcing the workpiece and the ram into the pliant vitreous material in said female die to cause said pliant vitreous material to exert a pressure against said workpiece and force it against the face of the ram.

2. The process defined in claim 1 in which said vitreous material is glass.

3. The process defined in claim 1 in which said vitreous material is heated to a temperature range of the order of 1200° F.–1400° F.

4. Apparatus for forming workpieces, and the like, using liquid dies, comprising:
   a female die in the form of a receptacle containing a quantity of vitreous material;
   a heating element mounted in said female die for heating said vitreous material in said die to an elevated temperature at which the metal workpiece can be worked and at which the vitreous material exhibits a pliant viscous property; and
   a ram mounted in cooperative relationship with said female die and in position in which it may be moved into said die, said ram supporting the workpiece and serving to force the workpiece into the pliant vitreous material in said female die to cause said pliant vitreous material to exert pressure against said workpiece and force it against the face of said ram.

5. The apparatus defined in claim 4 in which said vitreous material is glass.

6. The apparatus defined in claim 4 in which said heating element heats said vitreous material to a temperature range of the order of 1200° F.–1400° F.

References Cited

UNITED STATES PATENTS

| | | | |
|---|---|---|---|
| 284,526 | 9/1883 | Williams. | |
| 633,114 | 9/1899 | Berry | 72—60 |
| 672,081 | 4/1901 | Palmer | 72—57 |
| 2,111,695 | 3/1938 | Seeber. | |
| 2,158,044 | 5/1939 | Haller | 29—592 |
| 2,557,403 | 6/1951 | Arbogast. | |
| 3,209,439 | 10/1965 | Arbogast. | |
| 3,213,658 | 10/1965 | Brown | 72—47 |

CHARLES W. LANHAM, *Primary Examiner.*

K. C. DECKER, *Assistant Examiner.*

U.S. Cl. X.R.

72—364, 700